United States Patent [19]

Kawabata

[11] Patent Number: 4,703,193
[45] Date of Patent: Oct. 27, 1987

[54] APPARATUS FOR CONTROLLING THE PARALLEL OPERATION OF AN A-C OUTPUT CONVERTER FOR A COMMERCIAL POWER SOURCE INCLUDING A CIRCUIT FOR SIMULATING OUTPUT CURRENT FOR TEST PURPOSES

[75] Inventor: Takao Kawabata, Kobe, Japan

[73] Assignee: Mitsubishi Denki Kabushiki Kaisha, Tokyo, Japan

[21] Appl. No.: 901,273

[22] Filed: Aug. 28, 1986

[30] Foreign Application Priority Data

Aug. 30, 1985 [JP] Japan ................ 60-191337

[51] Int. Cl.$^4$ ........................... H02J 9/00
[52] U.S. Cl. ..................... 307/66; 307/46; 307/87
[58] Field of Search ............ 307/66, 64, 45, 46, 307/83, 87; 323/246, 244, 241

[56] References Cited

U.S. PATENT DOCUMENTS

| | | | |
|---|---|---|---|
| 4,251,735 | 2/1981 | Coleman | 307/66 X |
| 4,409,533 | 10/1983 | Kawabata | 307/87 X |
| 4,510,401 | 4/1985 | Legoult | 307/66 |
| 4,516,035 | 5/1985 | Rhoads et al. | 307/66 |
| 4,528,457 | 7/1985 | Keefe et al. | 307/66 X |
| 4,588,900 | 5/1986 | Honjo | 307/66 |
| 4,604,530 | 8/1986 | Shibuya | 307/66 |

OTHER PUBLICATIONS

"DC-TO-AC Power Converter for Fuel Cell System", Asaeda et al IECE Japan, Oct. 1983.
"The Interaction of Batteries and Fuel Cells with Electrical Distribution Systems: Force Commutated Converter Interface", Garais et al, IEEE, 1977.

Primary Examiner—William M. Shoop, Jr.
Assistant Examiner—Sharon D. Logan
Attorney, Agent, or Firm—Leydig, Voit & Mayer

[57] ABSTRACT

An apparatus for controlling the parallel operation of a commercial power source and an A-C output converter in which the A-C output converter of a variable voltage and a variable frequency is connected and operated in parallel with the commercial power source; an impedance element is provided between said commercial power source and an output terminal of at least one phase which represents an internally generated voltage of the A-C output converter, the impedance element being connected in parallel with an output impedance of a main circuit of the A-C output converter, and the voltage and frequency of the A-C output converter being controlled so that a current that flows through said impedance element assumes a predetermined value.

4 Claims, 5 Drawing Figures

APPARATUS FOR CONTROLLING THE PARALLEL OPERATION OF AN A-C OUTPUT CONVERTER FOR A COMMERCIAL POWER SOURCE INCLUDING A CIRCUIT FOR SIMULATING OUTPUT CURRENT FOR TEST PURPOSES

BACKGROUND OF THE INVENTION

The present invention relates to an apparatus for controlling the parallel operation of an A-C output converter and a commercial power source, in order to supply the electric power or to store the energy while operating the A-C output converter in parallel with the commercial power source in a power failure-free power source apparatus, in a solar generating system, in a fuel cell generating system or in a secondary cell energy storage system.

FIG. 5 shows a conventional apparatus of this kind, wherein reference numeral 1 denotes an inverter which is operated in parallel with a commercial power source 2 via a commercial bus 3 to supply electric power to a load 4. The inverter 1 is chiefly comprised of an inverter unit 100, an output transformer 101, a filtering reactor 102 and a filtering capacitor 103. The inverter 1 converts the electric power of a D-C power source 5 into an alternating current and is connected to the commercial bus 3 via an output switch 104.

The operation will be described hereinbelow. To operate the inverter 1 in parallel with the commercial power source 2, first, a detect signal $I_{10}$ is obtained by a current transformer 106 from an output current $I_1$ of the inverter 1. Then, two voltage vectors $E_A$ and $E_B$ that meet at right angles are obtained by a phase shifter 108, and are supplied to a Q detecting circuit 109 and a P detecting circuit 110, respectively, to obtain a component Q that corresponds to the reactive power and a component P that corresponds to the active power from the output current $I_1$ and the detect signal $I_{10}$. Relying upon the signals from a voltage setting circuit 111 and a voltage feedback circuit 112, the inverter 1 modulates the pulse width of the inverter unit 100 via a voltage control circuit 113 and a pulse width modulation (PWM) circuit 114, in order to control the internally generated voltage.

A subtracting circuit 117 finds a difference between the component Q that corresponds to the reactive current and a setpoint value $Q_R$ of the reactive power to be produced. The difference is amplified by a Q control circuit 116 and is supplied as an auxiliary signal to the voltage control circuit 113, in order to adjust by about several percent the internally generated voltage of the inverter unit 100 so that the component Q that corresponds to the reactive power is brought into agreement with the setpoint value $Q_R$ of the reactive power.

In the inverter 1, furthermore, a phase difference $\Delta\phi$ detecting circuit 124 detects a phase difference $\Delta\phi$ between the commercial bus 3 and the internally generated voltage of the inverter. A PLL amplifier 115 adjusts the frequency of a reference oscillator 105 so that it is brought into synchronism with the commercial power source 2, and that the phase difference is brought into zero. A subtracting circuit 119 finds a difference between the component P that corresponds to the active power and the active power $P_R$ that is to be produced. The difference is amplified by a P control circuit 118 and is supplied as an auxiliary signal to the PLL amplifier 115 in order to finely adjust the phase difference between the inverter 1 and the commercial power source 2, so that the active power P being produced is brought into agreement with the setpoint value.

As described above, the inverter 1 and the commercial power source 2 are operated in parallel to deal with the active power and the reactive power, and to stably carry out the operation.

With the conventional apparatus for controlling the parallel operation of the A-C output converter and the commercial power source constructed as described above, however, it is quite difficult to test and adjust the parallel operation. For example, to test and examine whether the inverter system to which the parallel operation system is adapted properly operates as expected or not, it is necessary to connect the inverter 1 to the commercial bus 3 to practically operate it. As is widely known, however, the inverters in general have an overcurrent withstand capacity of only about 150%. Therefore, it is quite difficult to examine the presence of any abnormal condition in the control circuit or to adjust the response characteristics of control while practically operating the system of FIG. 5.

In practice, therefore, operation of the whole system of FIG. 5 is tested after the individual elements in the control circuit of FIG. 5 are completely tested and adjusted, and after it has been confirmed that there is no error in the wirings among the elements. Even when sufficient attention is given to perform the parallel operation, however, an excess of transverse current flows due to unexpected faults, and the inverter often undergoes commutation failure and is damaged. This means that a very cumbersome operation is required to investigate the occurrence of trouble (particularly troubles such as a poor contact that develops when the reproduceability is not good) and to carry out regular maintenance.

SUMMARY OF THE INVENTION

The present invention was accomplished in order to eliminate the above-mentioned problems, and its object is to provide an apparatus for controlling the parallel operation of an A-C output converter and a commercial power source, which makes it possible to test and adjust the parallel operation control without really operating the main circuit in parallel with the commercial power cource but by connecting the main circuit via an impedance element, making it easy to carry out the testing, adjustment, maintenance and checking.

According to the conventional apparatus for controlling the parallel operation of the A-C output converter and the commercial power source, it is required to connect the output of the inverter to the commercial power source. According to the present invention, however, an impedance element simulating the impedance of the sum of the output transformer of the inverter and the output reactor, is connected between the commercial power source and the output terminal of the inverter pole of at least one phase which represents the internally generated voltage of the inverter.

According to the present invention, a current that flows through the impedance element represents a current of the main circuit. Namely, irrespective of whether the output of the inverter is connected to the commercial power source, a current flows into the impedance element, the current representing the current of the main circuit determined by the internally generated voltage of the inverter and the phase thereof.

By controlling the current, therefore, the current of the main circuit of the inverter can be controlled to assume a predetermined value. Moreover, the control of parallel operation can be confirmed by the control circuit only without the need of connecting the main circuit in parallel.

DESCRIPTION OF THE PREFERRED EMBODIMENTS

Figure 1:
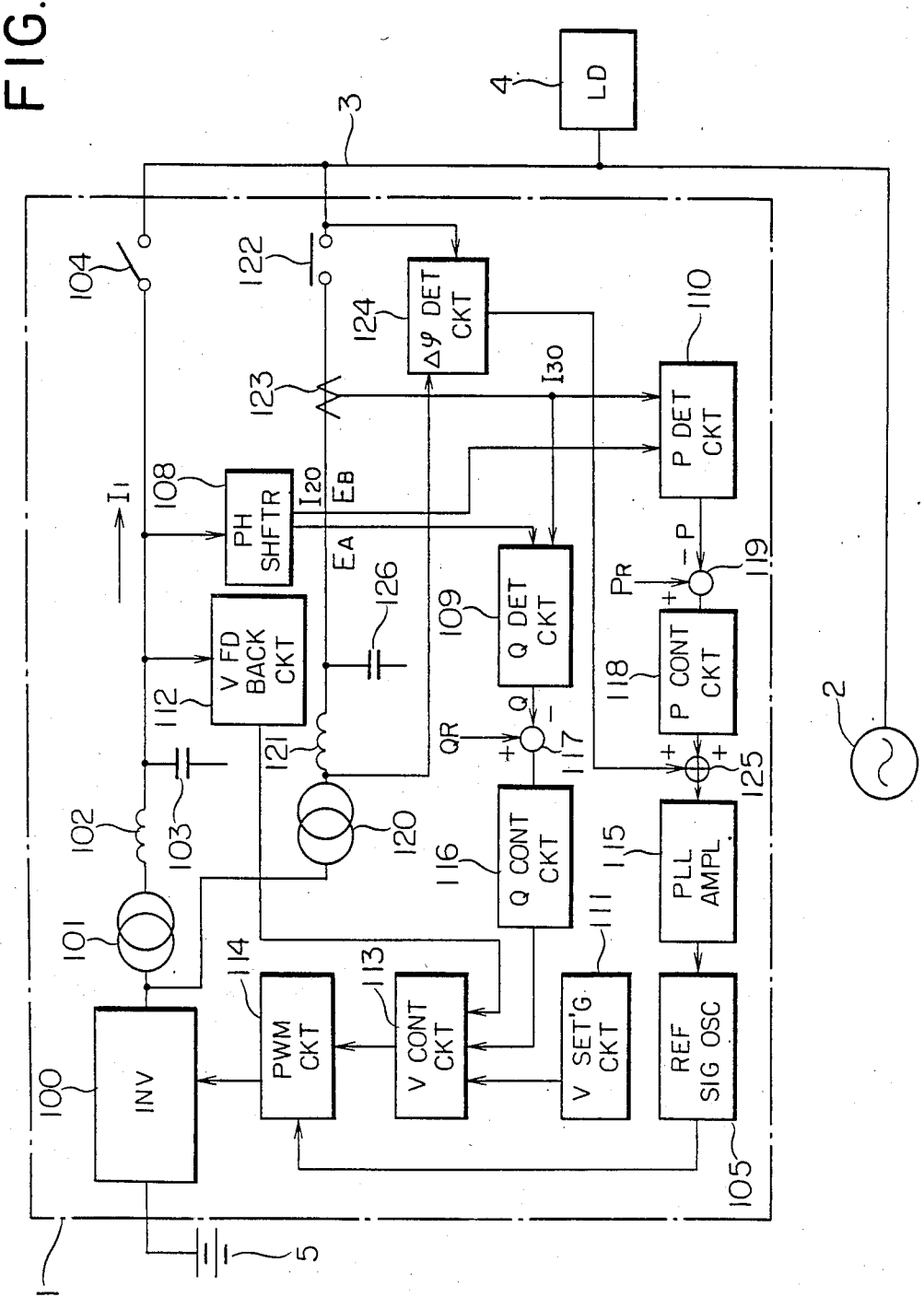
FIG. 1 is a block diagram illustrating the structure of a system according to an embodiment of the present invention.
Figure 5:
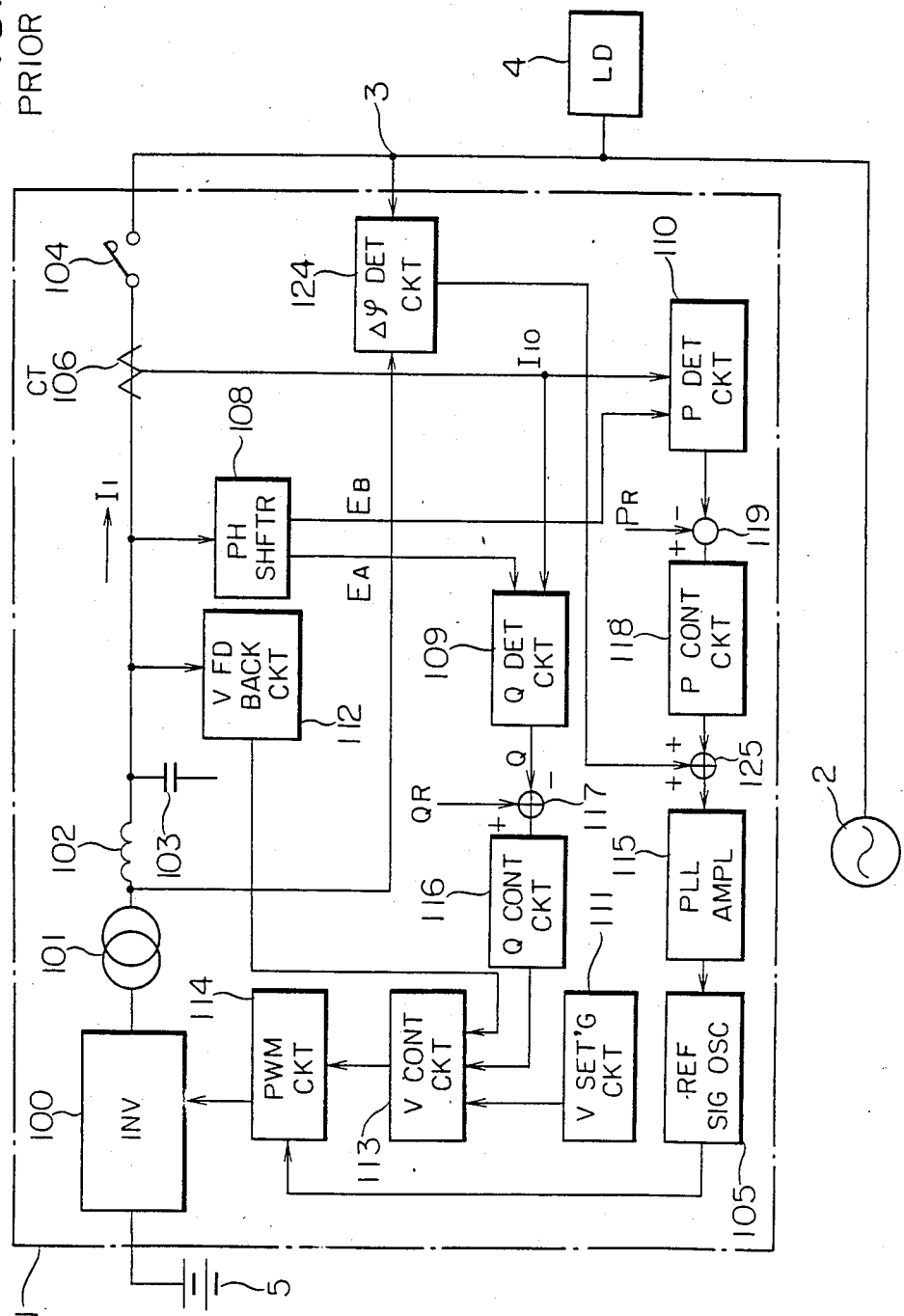
FIG. 5 is a block diagram illustrating the structure of a system of a conventional apparatus for controlling the parallel operation.

An embodiment of the present invention will now be described in conjunction with the drawings, wherein the same portions as those of FIG. 5 are denoted by the same reference numerals. In FIG. 1, a transformer 120 is connected to the output terminal of a pole which constitutes the inverter 1, and the secondary side of the transformer is connected to the commercial bus 3 via a reactor 121 and a switch 122. The transformer 120 is connected even when the inverter 100 has a capacity of about several tens of kilovoltamperes or has a capacity of as small as about several hundred of voltamperes.

The operation will be described below. First, for a rated current of the inverter 1, a corresponding current of the reactor 121 is set to be 1A. Namely, the impedance of the reactor 121 is so set that the current of the reactor 121 will be 1A when the inverter 1 is in rated output operation. Then, the impedance angle of a composite impedance of the transformer 120 and the reactor 121 is brought as close as possible to a composite impedance of the output transformer 101 and the filtering reactor 102. Further, a capacitor 126 is provided for a filtering capacitor 103, the capacitor 126 having a capacity reduced at an impedance ratio. Therefore, a simulated output current signal $I_{30}$ of a current transformer 123 represents the output current $I_1$ of the main circuit.

In practice, the inverter 1 may not have the filtering capacitor 103 and may be provided on the side of the commercial bus 3. In this case, the capacitor 126 is not needed, either.

Being constructed as described above, the output switch 104 is opened, and the switch 122 only is closed to obtain a signal that represents the output current of the inverter 1. Thus, the parallel operation is simulated and is tested, thereby to test and adjust the control circuit.

Figure 2:
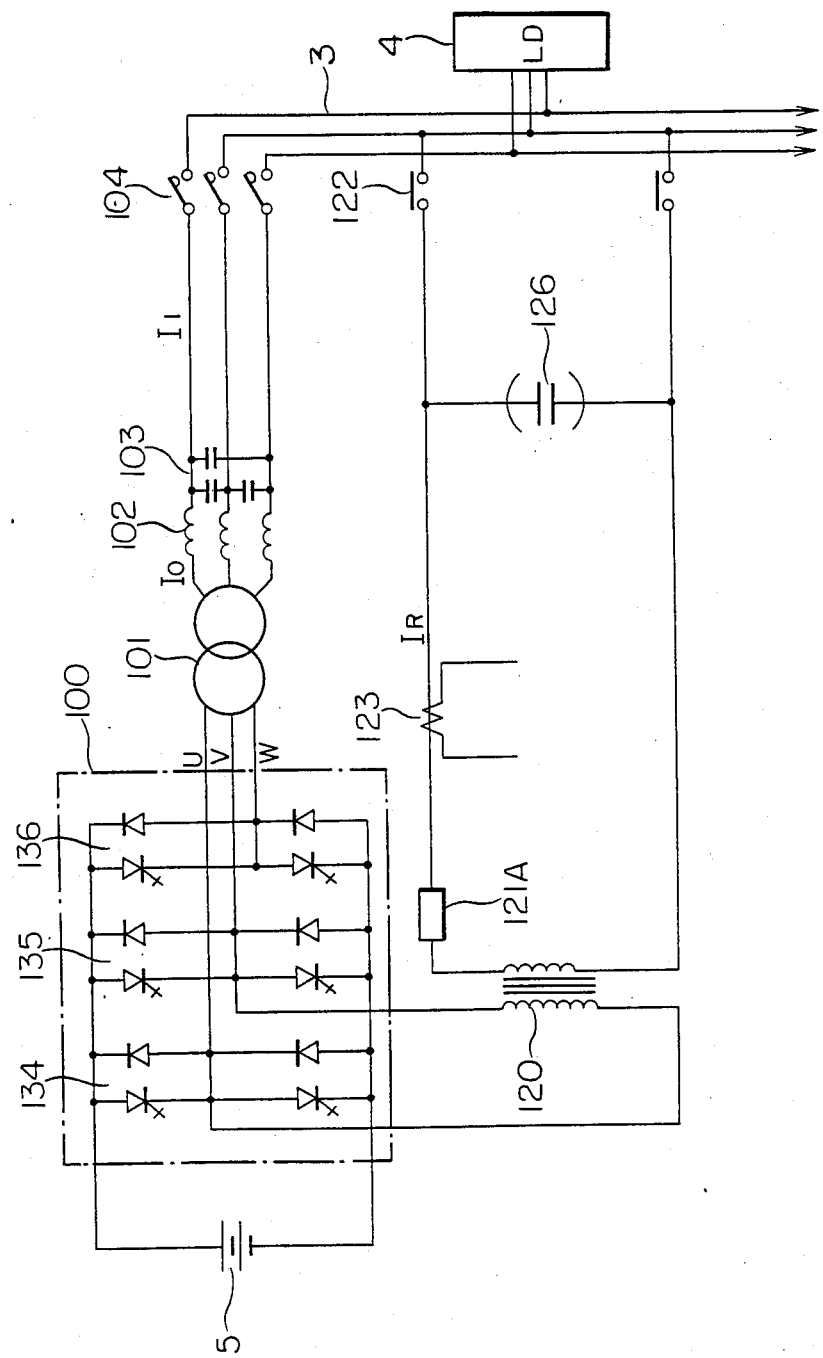
FIG. 2 is a circuit diagram of major portions according to another embodiment of the present invention.

FIG. 2 illustrates another embodiment according to the present invention. To simplify the drawing, control circuits same as those of FIG. 1 are not shown, and a main circuit portion only is depicted. Here, the transformer 120 is connected across the conversion poles 134 and 135 among the conversion poles 134, 135 and 136 of the U-, V- and W-phases, and a signal is representatively taken out across the U-phase and the V-phase. The portions same as those of FIG. 1 are not described. Here, however, a current transformer 123 is provided on more the output side than the capacitor 126. Further, an impedance element 121A is comprised of a resistor instead of an inductance. The current transformer 123 is located at the above-mentioned place. This is because, the filtering capacitor 103 of the main circuit is in parallel with the load 4 and can be regarded as part of the load 4. Namely, the parallel operation can be carried out even if a current $I_O$ in front of the filtering capacitor 103 is controlled in place of the current $I_1$ at the back of the filtering capacitor 103. From this point of view, the capacitor 126 needs not necessarily be provided.

Figure 3:
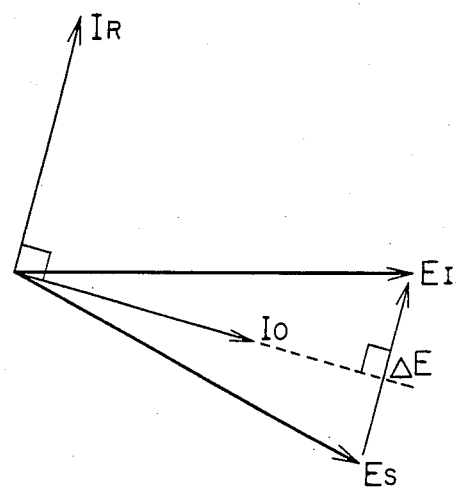
FIG. 3 is a vector diagram which explains the principle of FIG. 2.

Described below is the reason why the impedance element 121A may be comprised of a resistor in conjunction with FIG. 3. When the inverter is producing the effective power, the internal electromotive force $E_1$ establishes a phase relationship which advances ahead of the commercial bus voltage $E_S$ and a vector difference voltage $\Delta E$ forms a current $I_O$ in FIG. 3. If a composite impedance of the filtering reactor 102 and the output transformer 101 consists of nearly pure reactance, the current $I_O$ lags by 90 degrees behind the vector difference voltage $\Delta E$. If the impedance element 121A consists of a resistor and the X-component in the leakage impedance of the transformer 120 is sufficiently small, the current $I_R$ advances ahead of the current $I_O$ by 90 degrees. Here, the voltage components $E_A$ and $E_B$ are produced by the phase shifter 108 based upon the output voltages of the inverter, that are necessary to detect signals by the Q detecting circuit 109 and the P detecting circuit 110 shown in FIG. 1. In the case of FIG. 2, th voltage components $E_A$ and $E_B$ are produced that are advanced by 90 degrees with respect to the voltage components of FIG. 1, relying upon the same system as that of FIG. 1.

In the above-mentioned embodiment, the main circuit of the inverter has three phases but the simulated output current detecting circuit is inserted in a single phase only. This is because in an ordinary case, the three phases of the inverter are not individually controlled but are controlled all at one time. Therefore, only a given phase needs be controlled to control the load. If the circuit shown in FIG. 2 is provided for all three phases, the load can be balanced more excellently and more quickly.

Figure 4:
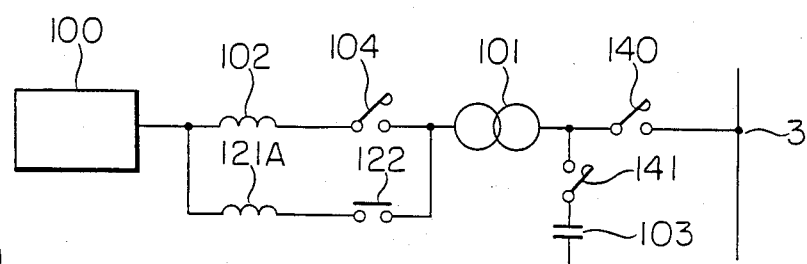
FIG. 4 is a system diagram to which further embodiments of the present invention are adapted.
Figure 4:
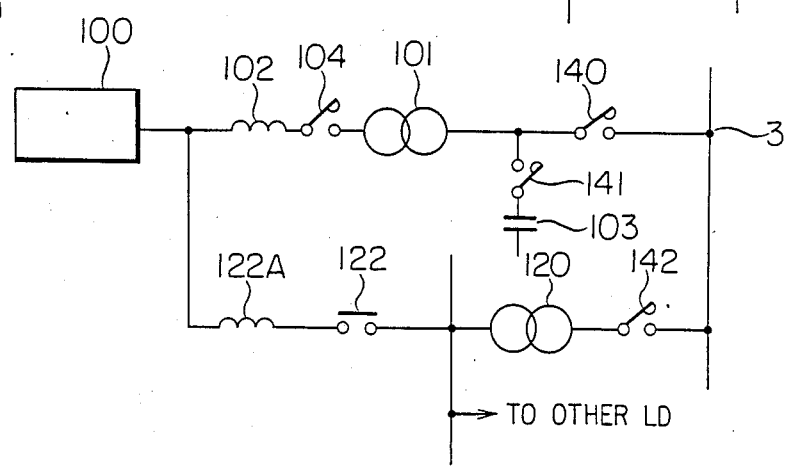

FIG. 4 shows connections of the output transformer 101 of the inverter 1, filtering reactor 102, filtering capacitor 103, and impedance element 121A of the present invention according to further embodiments.

According to the system of FIG. 4a, the commercial bus 3 is maintained at a high voltage, and the voltage is boosted through the transformer 101 and is connected in parallel with the commercial bus 3 via a second output switch 140. In this case, the filtering capacitor 103 is also provided in many cases on the high-voltage side through the switch 141. To test and adjust the system for controlling the parallel operation, the switch 104 is opened, the switch 122 and the output switch 140 are closed, and the output transformer 101 is reversely charged from the commercial power source.

According to the system of FIG. 4b, the impedance element 122A is not connected to the output transformer 101 of the inverter but is connected to another transformer 120 that is connected to the same bus, and the output switches 104 and 140 are opened to test the control circuit under the condition where the output transformer 101 is not excited. The transformer 120 may be commonly used by other load, or may be constituted by an exclusively provided power transformer.

The foregoing description has dealt with a voltage-type inverter of the constant voltage, constant frequency and sinusoidal wave outputs. However, the principle of the present invention can quite similarly be adapted to the converters of any other type such as current-type inverter, cycloconverter and the like.

According to the present invention as described above, it is allowed to supply to the control circuit a current signal equivalent to a current that will flow when the main circuit is connected in parallel with the commercial bus without the need of really connecting the main circuit in parallel with the commercial bus. Therefore, the control circuit that has not been completely adjusted can be easily tested, adjusted, or can be investigated for its cause of trouble.

What is claimed is:

1. An apparatus for controlling the parallel operation of a commercial power source and an A-C output converter of a variable voltage and a variable frequency said apparatus comprising simulated output current detecting circuit means including an impedance element provided between said commercial power source and an output terminal of at least one phase which represents an internally generated voltage of the A-C output converter, said impedance element being connected in parallel with an output impedance of a main circuit of the A-C output converter which is connected at an output to the commercial power source, said simulated output current detecting circuit means including means operable independently of the main circuit to selectively activate said detecting circuit means and cause a simulated output current to flow through said impedance element, and means for controlling the voltage and frequency of the A-C output converter so that the simulated output current that flows through said impedance element assumes a predetermined value.

2. An apparatus for controlling the operation of a commercial power source and an A-C output converter in which the A-C output converter of a variable voltage and a variable frequency is connected and operated in parallel with the commercial power source, said apparatus comprising an impedance element provided between the commercial power source and an output terminal of at least one phase which represents an internally generated voltage of the A-C output converter, said impedance element comprising an insulating transformer and a reactor, said impedance element being connected in parallel with an output impedance of a main circuit of the A-C output converter, said apparatus further comprising simulated output current detecting circuit means including means for combining a representative value of the internally generated voltage and a voltage of the commercial power source and causing a simulated output current to flow through said impedance element, said insulating transformer and said reactor having an impedance angle substantially equal to an impedance angle of the output impedance of the main circuit, and means for controlling the voltage and frequency of the A-C output converter so that the simulated output current that flows through said impedance element assumes a predetermined value.

3. An apparatus for controlling the parallel operation of a commercial power source and an A-C output converter in which the A-C output converter of a variable voltage and a variable frequency is connected and operated in parallel with the commercial power source, said apparatus comprising an impedance element provided between the commercial power source and an output terminal of at least one phase which represents an internally generated voltage of the A-C output converter, said impedance element being connected in parallel with an output impedance of a main circuit of the A-C output converter, said apparatus further comprising simulated output current detecting circuit means including means for causing a simulated output current to flow through said impedance element, means for decomposing the current that flows through said impedance element into a component that changes mainly with change of voltage and a component that changes mainly with change of phase, and means for controlling the voltage and the frequency of the A-C output converter so that the respective components assume predetermined values and the simulated output current that flows through said impedance element assumes a predetermined value.--;

4. An apparatus for controlling the parallel operation of a commercial power source and an A-C output converter in which the A-C output converter of a variable voltage and a variable frequency is connected and operated in parallel with the commercial power source, said apparatus comprising an impedance element provided between said commercial power source and an output terminal of at least one phase which represents an internally generated voltage of the A-C output converter, said impedance element being connected in parallel with an output impedance of a main circuit of the A-C output converter to the commercial power source via a transformer, and means for controlling the voltage and the frequency of the A-C output converter so that a simulated output current that flows through said impedance element assumes a predetermined value.

* * * * *